(12) United States Patent
Varekamp et al.

(10) Patent No.: US 10,931,928 B2
(45) Date of Patent: Feb. 23, 2021

(54) IMAGE GENERATION FROM VIDEO

(71) Applicant: KONINKLIJKE PHILIPS N.V., Eindhoven (NL)

(72) Inventors: Christiaan Varekamp, Veldhoven (NL); Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/497,498

(22) PCT Filed: Mar. 2, 2018

(86) PCT No.: PCT/EP2018/055183
§ 371 (c)(1),
(2) Date: Sep. 25, 2019

(87) PCT Pub. No.: WO2018/177681
PCT Pub. Date: Oct. 4, 2018

(65) Prior Publication Data
US 2020/0045287 A1 Feb. 6, 2020

(30) Foreign Application Priority Data

Mar. 29, 2017 (EP) .................................... 17163509

(51) Int. Cl.
*H04N 13/117* (2018.01)
*G06K 9/00* (2006.01)
*G06K 9/20* (2006.01)

(52) U.S. Cl.
CPC ....... *H04N 13/117* (2018.05); *G06K 9/00791* (2013.01); *G06K 9/20* (2013.01)

(58) Field of Classification Search
None
See application file for complete search history.

(56) References Cited

U.S. PATENT DOCUMENTS

2004/0032410 A1 2/2004 Ryan
2007/0030342 A1 2/2007 Wilburn et al.
(Continued)

FOREIGN PATENT DOCUMENTS

CN 102496331 A 6/2012

OTHER PUBLICATIONS https://en.wikipedia.org/wiki/Dynamic_Adaptive_Streaming_over_HTTP (downloaded on Sep. 20, 2019).
(Continued)

*Primary Examiner* — Jared Walker

(57) ABSTRACT

An apparatus comprising a store (101) for storing route data for a set of routes in an N-dimensional space where each route of the set of routes is associated with a video item including frames comprising both image and depth information. An input (105) receives a viewer position indication and a selector (107) selects a first route of the set of routes in response to a selection criterion dependent on a distance metric dependent on the viewer position indication and positions of the routes of the set of routes. A retriever (103, 109) retrieves a first video item associated with the first route from a video source (203). An image generator (111) generates at least one view image for the viewer position indication from a first set of frames from the first video item. In the system, the selection criterion is biased towards a currently selected route relative to other routes of the set of routes.

20 Claims, 8 Drawing Sheets

(56) References Cited

U.S. PATENT DOCUMENTS

| | | |
|---|---|---|
| 2014/0267589 A1 | 9/2014 | Matsubara et al. |
| 2016/0330408 A1 | 11/2016 | Costanzo |
| 2017/0123422 A1* | 5/2017 | Kentley .................. B60L 15/20 |
| 2017/0124781 A1* | 5/2017 | Douillard ............... G08G 1/202 |
| 2017/0230633 A1 | 8/2017 | Doh |
| 2017/0329329 A1* | 11/2017 | Kamhi ............... G06K 9/00604 |
| 2018/0136651 A1* | 5/2018 | Levinson ............. G05D 1/0027 |
| 2018/0203458 A1* | 7/2018 | Zhang .................. G05D 1/0255 |
| 2019/0273902 A1 | 9/2019 | Varekamp et al. |

OTHER PUBLICATIONS

International Search Report from PCT/EP2018/055183 dated May 4, 2018.

* cited by examiner

IMAGE GENERATION FROM VIDEO

CROSS-REFERENCE TO PRIOR APPLICATIONS

This application is the U.S. National Phase application under 35 U.S.C. § 371 of International Application No. PCT/EP2018/055183, filed on Mar. 2, 2018, which claims the benefit of EP Patent Application No. EP17163509.7, filed on Mar. 29, 2017. These applications are hereby incorporated by reference herein.

FIELD OF THE INVENTION

The invention relates to generation of images from video items and in particular, but not exclusively, to generation of view images for a virtual reality environment from stored video items which may originate from video capture of real world environments.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

Typically, virtual reality applications are inherently limited in that they are based on a predetermined model of the scene, and typically on an artificial model of a virtual world. It would be desirable if a virtual reality experience could be provided based on real world capture. However, in many cases such an approach is very restricted or tends to require that a virtual model of the real world is built from the real world captures. The virtual reality experience is then generated by evaluating this model.

However, the current approaches tend to be suboptimal and tend to often have a high computational or communication resource requirement and/or provide a suboptimal user experience with e.g. reduced quality or restricted freedom.

As an example of an application, virtual reality glasses are currently entering the market. These glasses allow viewers to experience captured 360 degree (panoramic) video. These 360 degree videos are often pre-captured using camera rigs where individual images are stitched together into a single spherical mapping. Common stereo formats for 360 video are top/bottom and left/right. Similar to non-panoramic stereo video, the left-eye and right-eye pictures are compressed as part of a single H.264 video stream. After decoding a single frame, the viewer rotates his/her head to view the world around him/her. A current example, is a recording made by Google of a concert in Carnegie Hall [https://performingarts.withgoogle.tabhumblecom/en_us/performances/carnegie-hall]. In this example, viewers can experience a 360 degree look-around effect, and can discretely switch between three video streams recorded from different positions. When switching, another video stream is loaded, which interrupts the experience.

One drawback of the stereo panoramic video approach is that the viewer cannot change position in the virtual world. Encoding and transmission of a panoramic depth map besides the panoramic stereo video could allow for compensation of small translational motions of the viewer at the client side but such compensations would inherently be limited to small variations and movements and would not be able to provide an immersive and free virtual reality experience.

A related technology is free-viewpoint video in which multiple view-points with depth maps are encoded and transmitted in a single video stream. The bitrate of the video stream could be reduced by exploiting angular dependencies between the view-points in addition to the well-known temporal prediction schemes. However, the approach still requires a high bit rate and is restrictive in terms of the images that can be generated. It cannot practically provide an experience of completely free movement in a three-dimensional virtual reality world.

Unfortunately, none of the prior-art technologies can deliver an ideal experience but often tend to be restrictive in the freedom of the changes in the positions and viewing directions. In addition, the technologies tend to require a very high data rate and provide data streams that include more data than is necessary for the generation of the individual images/views.

Further, prior art approaches tend to require large storage capacity in order to store a large number of e.g. individually captured images. Also, prior art approaches tend to require relatively complex processing and have high resource computational demands. Despite this, the prior art approaches tend to result in a suboptimal generation of view images, and in particular a disjointed and relatively inconsistent experience is often provided to a user moving an a virtual world.

For example, KR2017/0007098 A discloses a system for generating images for a given user pose that may differ from capture poses for which an image of the scene has been captured. The approach may select a nearest capture pose and generate a view image for the user pose from the image from the nearest capture pose. However, the approach tends to suffer from all the disadvantages described above and in particular requires high computational resource, is complex, is based on complex and difficult capture operations, and tends to generate view images that are not of optimal quality and furthermore tend to be inconsistent when a user moves.

Hence, an improved approach would be advantageous. In particular, an approach that allows improved operation, increased flexibility, increased scope for generating images corresponding to different viewing positions and directions, an improved virtual reality experience, reduced data rates, facilitated distribution, reduced complexity, facilitated implementation, reduced storage requirements, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination. According to an aspect of the invention there is provided an apparatus comprising: a store for storing a set of routes in an N-dimensional space representing spatial poses, the set of routes comprising a plurality of routes and each route of the set of routes describing a camera trajectory of poses through the N-dimensional space and being linked to a video item including frames comprising both image and depth information for camera poses of the route; an input for receiving a viewer position indication; a selector for selecting a first route of the set of routes in response to a selection criterion dependent on a distance metric dependent on the viewer position indication and positions of the routes of the set of routes; a retriever for retrieving a first video item associated with the first route from a video source; an image generator for generating at least one view image for the viewer position indication from a first set of frames from the first video item; wherein the selection criterion is biased towards a currently selected route relative to other routes of the set of routes.

The approach may provide improved performance and/or operation in many scenarios and for many applications. In particular, the approach may provide an improved virtual reality experience in many scenarios. In particular, an efficient approach with low latency, high quality, low communication resource requirement, low storage resource requirement, and/or low computational resource requirement, can often be achieved.

The approach may for example allow reduced communication or computational resource requirements for a client server arrangement for providing a virtual reality experience at a client device based on a server storing video items, and possibly also providing the route data.

The approach may for example be used to represent a virtual environment based on video items associated with (linked to) route data rather than being based on individual images and associated positions. This may for example allow the use of efficient video encoding techniques resulting in reduced storage and communication resources.

The approach may in many embodiments allow facilitated generation of data representing a virtual environment from real world captures. For example, a virtual experience in a virtual environment corresponding to a real world environment can effectively be generated based on video items captured when moving around in the real world environment.

The N-dimensional space may specifically comprise dimensions relating to a location and/or view orientation in the N-dimensional space. N is an integer which specifically may represent 1-3 spatial dimensions reflecting a location in a virtual environment and 1-3 spatial dimensions reflecting a view orientation in the virtual environment.

The viewer position indication may specifically be an M-dimensional (with M typically be equal to N) indication of a position in the N-dimensional space. The viewer position indication may specifically represent 1-3 spatial dimensions reflecting a location in a virtual environment and 1-3 spatial dimensions reflecting a view orientation in the virtual environment.

The video items include both images and depth information thereby allowing view image generation from view points that may differ from those captured by the video items. This may provide an improved experience, e.g. allowing a user to turn with respect to the camera direction of the images of the video items.

Each route may be linked to one video item with the route describing a (possibly virtual) camera trajectory through the N-dimensional space corresponding to the video item. Positions along the route may be associated with positions of the frames of the video items.

The selector may be arranged to increase the probability of a given route being selected in response to the distance metric for that route being indicative of a decreasing distance between the viewer position indication and the given route. The distance metric may e.g. be based on a suitable norm.

The view image may be generated to correspond to the view that will be perceived by a viewer at a position in the N-dimensional space given by the viewer position indication.

The input may receive a sequence of viewer position indications and the apparatus may be arranged to generate a corresponding sequence of view images. The operation of the apparatus may be dynamically iterated thereby providing a dynamic user experience. For example, viewer position indications may describe path or route through the N-dimensional space, and the apparatus may in response generate a sequence of images corresponding to the views that would be experienced by a viewer moving along that path or route.

The currently selected route may be a route selected for a previous viewer position indication, and specifically may be a route selected for the last received viewer position indication. In particular, the viewer position indication may be a viewer position indication in a sequence of viewer position indications, and the currently selected route may be the route selected for the last viewer position indication received prior to the current viewer position indication.

The video items may be encoded video items. The video items may comprise intra-coded frames and inter-coded frames. Intra-coded frames are encoded independently of other frames. Inter-coded frames are encoded relative to at least one other frame. The video items may comprise I frames and B and/or P encoded frames.

The biasing towards the currently selected route may be implemented by the selection criterion being different for the currently selected route than for other routes of the set of routes. The selection criterion may be asymmetric with respect to the currently selected route and other routes of the set of routes. Specifically, the selection criterion may be asymmetric with respect to a distance metric for the currently selected route relative to distance metrics for other routes of the set of routes.

The selection criterion may be arranged to result in different routes being selected for different values of the viewer position indication. The bias may be such that the currently selected route will be selected unless the distance metric to another route is shorter than the distance metric to the current route by a factor larger than one.

The first set of frames may be one or more frames. In some embodiments, the image generator may be arranged to further generate the view image in response to frames from more than one video item. For example, if a new route is selected, the view image may be generated from frames of both the previously selected route and the newly selected route. In accordance with an optional feature of the invention, the image generator is arranged to select the first frames in response to route position data for frames of the first video item relative to the viewer position indication.

This may provide improved performance and/or operation in many embodiments.

In accordance with an optional feature of the invention, the image generator is arranged to, if the first route is selected as the currently selected route, bias selection of the first set of frames towards frames having a smaller temporal distance to a currently selected first set of frames of the first video item.

This may provide improved performance and/or operation in many embodiments. It may in particular provide improved temporal consistency and may mitigate temporally varying artefacts.

In accordance with an optional feature of the invention, the image generator is arranged to, if the first route is selected as the currently selected route, perform the selection of the first set of frames based on a frame selection metric which increases with a decreasing temporal distance to a currently selected frame of the first video item.

This may provide improved performance and/or operation in many embodiments. It may in particular provide improved temporal consistency and may mitigate temporally varying artefacts.

In accordance with an optional feature of the invention, the store is further arranged to store intersect positions for routes of the video sequences; and the selection criterion is dependent on the intersect positions.

This may provide improved performance in many embodiments and may in particular provide improved selection of suitable video items. It may for example in some embodiments reduce latency e.g. by allowing the apparatus to retrieve video items for potential future routes intersecting with the current route.

The intersect positions may be indicative of intersections between routes and may be provided e.g. in coordinates of (at least some) of the dimensions of the N-dimensional space or may e.g. be given relative to the route data or video item (such as e.g. a frame number).

An intersection may be considered to be present if positions of two routes are at a distance below a threshold.

An intersection may be any junction, including a T-junction or a junction between the end of one route and the beginning of another.

In accordance with an optional feature of the invention, the selector is arranged to reduce the bias towards the currently selected route for viewer position indications corresponding to intersect positions.

This may provide improved performance and may specifically improve the transition between different video items by making such transitions more likely at intersections than elsewhere. In some embodiments, transitions to a new route may only be allowed at intersections.

In accordance with an optional feature of the invention, wherein the bias towards the currently selected route is dependent on a distance between the viewer position indication and intersect positions.

This may provide improved performance and may specifically improve the transition between different video items by making such transitions more likely at intersections than elsewhere. In some embodiments, transitions to a new route may only be allowed at intersections.

In accordance with an optional feature of the invention, the store is arranged to store a graph having intersections as nodes and routes reflected by edges.

This may provide particularly efficient operation in many embodiments.

In accordance with an optional feature of the invention, frames associated with intersection positions for at least some video sequences are intra coded frames.

This may facilitate and/or improve operation in many embodiments. For example, it may facilitate transition between different routes/video items as it may reduce the number of frames that need to be decoded.

In accordance with an optional feature of the invention, the image generator is arranged to generate the view image from at least a first frame of the first set of frames and a second frame from a previously selected second route.

This may facilitate and/or improve operation in many embodiments.

The first frame may be selected as an intra-coded frame and/or the second frame may be selected as an intra-coded frame. The first frame may specifically be an intersection frame. The generation of the view image may include decoding a predicted frame (often a bi-directional (B)) frame from an intra-coded (I) frame from a previously selected route and an intra-coded (I)-frame (the first frame) from the first route. (The previously selected route may correspond to the currently selected route prior to the selection of the first route, especially when the selector selects the first route as a different route than the currently selected route (prior to the selection of the first route)). This may typically be the scenario when the apparatus switches from one route to another route.

In accordance with an optional feature of the invention, the second frame is a frame associated with an intersection between the first route and the previously selected second route.

This may facilitate and/or improve operation in many embodiments.

In accordance with an optional feature of the invention, the store is further arranged to store relationship data indicative of a spatial relationship between routes of the set of routes, and the selection of the first route is in response to the relationship data.

This may provide improved performance and/or operation in many embodiments.

In accordance with an optional feature of the invention, the relationship data may be indicative of at least one spatial relationship between two routes from the group of: a crossing of the two routes; a junction of the two routes; a first route of the two routes corresponding to an opposite direction of movement to a second route of the two routes; and the two routes being parallel.

This may provide improved performance and/or operation in many embodiments.

In accordance with an optional feature of the invention, the video items are encoded video items comprising both intra-coded frames and inter-coded frames, and the selector is arranged to reduce the bias towards the currently selected route for viewer position indications corresponding to intra-coded frames relative to viewer position indications corresponding to inter-coded frames.

This may reduce computational resource usage, and in particular may reduce the complexity and resource use for decoding frames suitable for generating the view images.

According to an aspect of the invention there is provided a method comprising: storing a set of routes in an N-dimensional space representing spatial poses, the set of routes comprising a plurality of routes and each route of the set of routes describing a camera trajectory of poses through the N-dimensional space and being linked to a video item including frames comprising both image and depth information for camera poses of the route; receiving a viewer position indication; selecting a first route of the set of routes in response to a selection criterion dependent on a distance metric dependent on the viewer position indication and positions of the routes of the set of routes; retrieving a first video item associated with the first route from a video source; generating at least one view image for the viewer position indication from a first set of frames from the first video item; wherein the selection criterion is biased towards a currently selected route relative to other routes of the set of routes.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME
EMBODIMENTS OF THE INVENTION

Virtual experiences allowing a user to move around in a virtual world are becoming increasingly popular and services are being developed to satisfy such a demand. However, provision of efficient virtual reality services is very challenging, in particular if the experience is to be based on a capture of a real world environment rather than on a fully virtually generated artificial world.

An approach for providing a virtual reality service is to store a large number of images with each image being linked to a specific position and typically view orientation/direction. Given a user location in the virtual world, the stored positions can be searched to retrieve an image for that position (or for a near position), and this can be rendered appropriately for the user. For example, a server may receive positions of users and may extract the relevant images from a local image store and generate a dedicated video sequence corresponding to the path of the user through the virtual world.

However, such an approach will require a large amount of data to be stored in order to ensure sufficient coverage of the virtual environment. The density of images required, and thus the total number of images that need to be stored, may be reduced by storing depth information together with the images. This may allow a local generation of view images for view positions and directions that do not exactly align with the stored positions and directions. However, a large number of stored images are typically still needed. Further, the data structure required to individually store images and associated positions typically does not allow optimized storage efficiency.

Further, the approach results in a relatively high complexity with typically a relatively high computational and communication resource usage. In particular, the approach does not scale well to e.g. an increasing number of users accessing a common server over the Internet. In such a case, the server will need to generate a dedicated video signal for each user and accordingly individually perform (typically complex) video encoding for each user.

Figure 1:
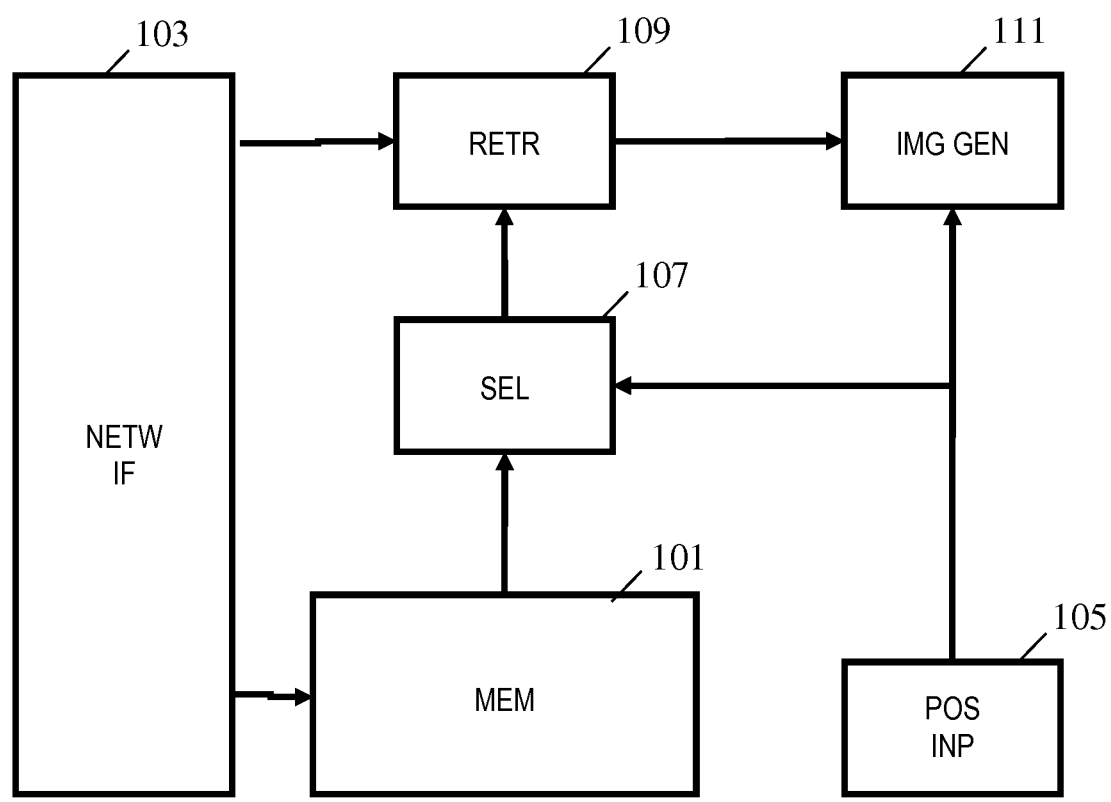
FIG. 1 illustrates an example of elements of a device for generating view images in response to a viewer position indication in accordance with some embodiments of the invention.
Figure 2:
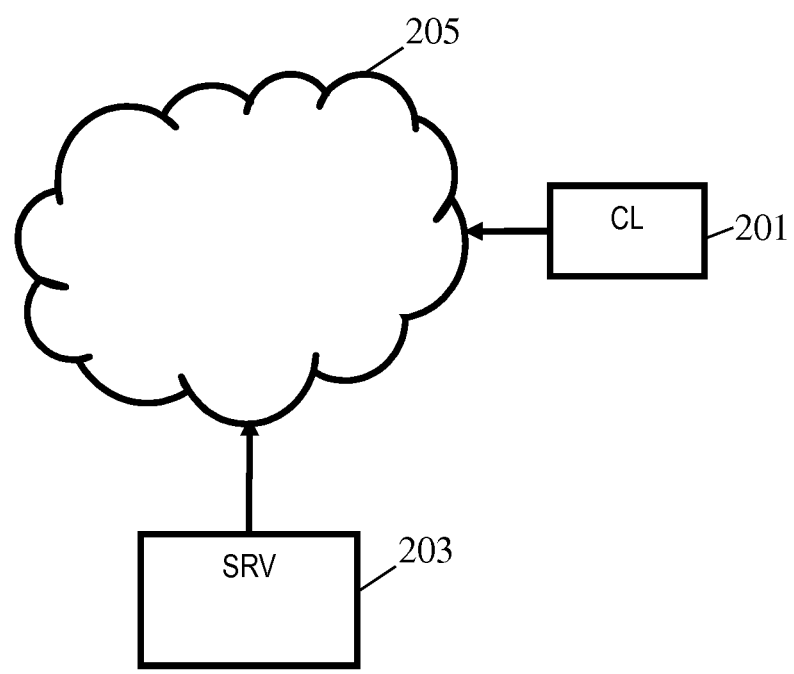
FIG. 2 illustrates an example of client server arrangement including the device of FIG. 1 as a client device.

FIG. 1 illustrates an apparatus which may provide an improved virtual reality user experience in many scenarios. In some embodiments, the apparatus may be a client device 201 which liaises with a remote server 203 e.g. via a network 205, such as the Internet, as illustrated in FIG. 2. The server 203 may be arranged to simultaneously support a potentially large number of client devices 201.

The apparatus is arranged to generate images corresponding to views of a scene for a given observer view pose. In many embodiments, the apparatus is arranged to generate stereo images for a given observer pose, or equivalently two images may be generated for slightly different observer poses corresponding to the offset between a viewer's two eyes.

In the field, the terms placement and pose are used as a common term for position and/or direction/orientation. The combination of the position and direction/orientation of e.g. an object, a camera, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom). The description will focus on embodiments and examples where a pose has the maximum degrees of freedom, i.e. three degrees of freedom of each of the position and the orientation resulting in a total of six degrees of freedom. The pose may thus be represented by a set or vector of six values representing the six degrees of freedom and thus the pose vector may provide a three-dimensional position and/or a three-dimensional direction indication. However, it will be appreciated that in other embodiments, the pose may be represented by fewer values.

The apparatus comprises a store 101 which is arranged to store route data for a set of routes in an N-dimensional space (where N is an integer). The N-dimensional space may be the space of a virtual world, and in particular may be a 3-dimensional space corresponding to the locations of the user in the space. In some embodiments, one or more of the dimensions may correspond to a view orientation in the virtual space. Thus, in some embodiments, the user may be represented by three degrees of freedom (3DoF) and in other embodiments by e.g. six degrees of freedom (6DoF), corresponding to a 3-dimensional location and a three dimensional orientation. The N-dimensional space represents spatial poses, and specifically represents poses in an N-dimensional space representing spatial dimensions in a virtual world.

The store 101 thus stores routes (e.g. paths or trajectories) in the N-dimensional space. Each of the routes provides a path or trajectory through the virtual reality world. Further, each of the set of routes that has been stored is associated with/linked to a video item. Thus, each route is linked to a video item which comprises a sequence of images corresponding to the positions and/or orientations of the route. Equivalently, each video item may provide a sequence of images corresponding to the views along the route. The video item for a given route accordingly comprises a sequence of images corresponding to the views when moving along the route. Accordingly, rather than corresponding to a static image, position, or view, the video item for a specific route provides images that would be captured by a camera when moving along the route, or equivalently would be experienced by a virtual user moving along the route. Each video item includes frames comprising both image and depth information for camera poses of the linked route and each route describes a corresponding camera trajectory of poses (camera poses) through the N-dimensional space.

Each video item may comprise a sequence of images corresponding to a sequence of positions along the route. Playing the video item will provide the views of a person or camera moving along the route. Each of the routes may be represented by a sequence of positions along the routes. In some embodiments, only explicitly defined positions may be considered (for example, one position may be included for each frame) whereas in other embodiments positions in between explicit values stored in the store may be determined by interpolation). In other embodiments, each route may for example be defined by a mathematical function providing, e.g. three, position values as a function of a time variable. The time variable may e.g. be quantized into time segments corresponding to the frame times for the corresponding video item.

In the example, the store 101 is coupled to a network interface 103 which interfaces the client device 201 to the network 205 (which in the following description will be considered to be the Internet). The network interface 103 may in particular provide functionality for the client device 201 to connect to the server 203.

Figure 3:
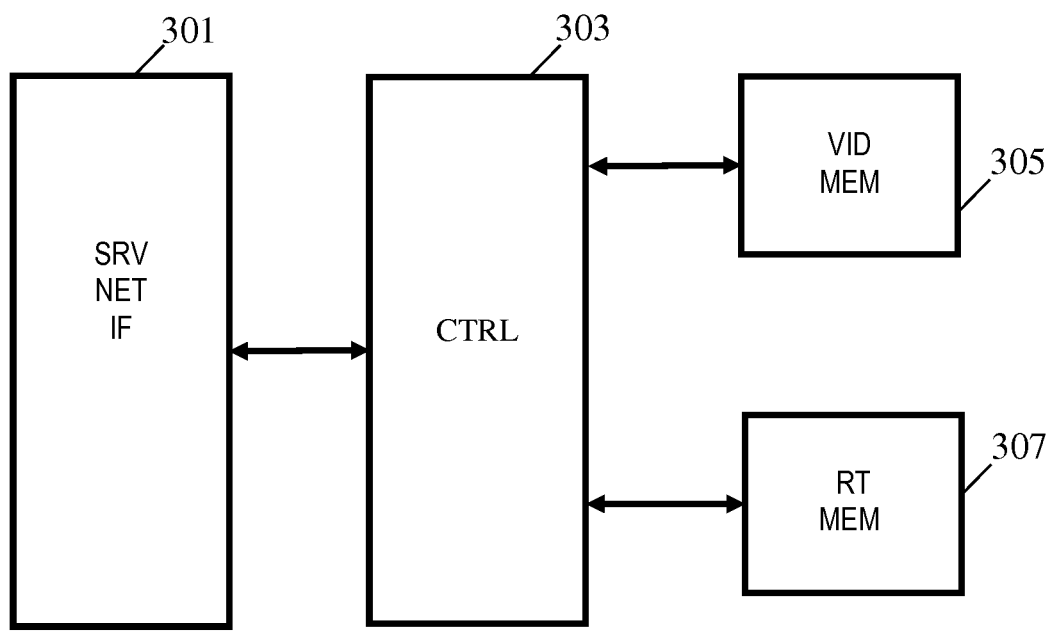
FIG. 3 illustrates an example of a server for the client server arrangement of FIG. 2.

In the example, the server 203 is a common server that simultaneously can serve a plurality of users. Some elements of the server 203 is illustrated in FIG. 3. In the example, the server 203 comprises a server network interface 301 which is arranged to interface the server 203 to the network 205 thereby allowing it to communicate with the client device 201. The server network interface 301 is coupled to a server controller 303 which is arranged to control and perform much of the operation of the server 203. The server controller 303 is coupled to a video store 305 and a route store 307.

In the example, the route store 307 stores route data for the set of routes and the video store 305 stores the corresponding linked video items. The server 203 may specifically represent a virtual reality world by a set of routes with associated video items as previously described. For example, a virtual environment may be represented by a (possibly relatively large) number of routes through the N-dimensional space of the virtual environment. For each of the routes, a video item is stored which represents the views along the routes, i.e. the video item may be generated to represent the views of a camera or user when moving along the route.

In many embodiments, the virtual environment may be a representation of a real environment and the video items and routes may be generated by a recording/capture in a real environment. For example, a position aware video camera may be carried through real environment and the captured video may be stored as a video item and the corresponding positional information may be stored as a route. In some embodiments, the video item and route data may be generated from a virtual model of a virtual environment, e.g. by moving a virtual camera through the virtual environment.

The stored video items comprise a sequence of frames/images representing views along the routes. A particular advantage of the approach is that video encoding techniques can be used to encode the frames/images thereby generating the video items. This allows for very efficient encoding resulting in lower data rates for a given image quality and thereby typically allowing a much more efficient encoding than when encoding individual images. Specifically, video encoding techniques such as motion estimation and (typically bidirectional) predictive video encoding can be used to reduce the amount of data. In the specific embodiment, the frames are encoded as either I-frames (intra-frames—encoded without relying on any other frames) or as B-frames (bidirectional frames—residual frames coded relative to I-frames, specifically based on motion estimation from I-frames). Further, in addition to the reduced storage and communication requirements, the use of video encoding allows efficient off-the-shelve encoding and decoding functionality (including dedicated hardware) to be used. Video encoding techniques that may be used include for example H.264 or MPEG2 encoding.

The video items comprise both image and depth information. Specifically, the video items may be 3D video items where the light intensity images/frames are associated with depth information for the frames. It will be appreciated that different approaches for providing depth information may be used including stereo images, explicit depth or disparity maps etc. The depth information allows for flexibility in view generation and specifically allows, facilitates, or improves the generation of view images corresponding to positions (/orientations) that do not exactly line up with the positions for which the routes/video items provide an image.

Figure 4:
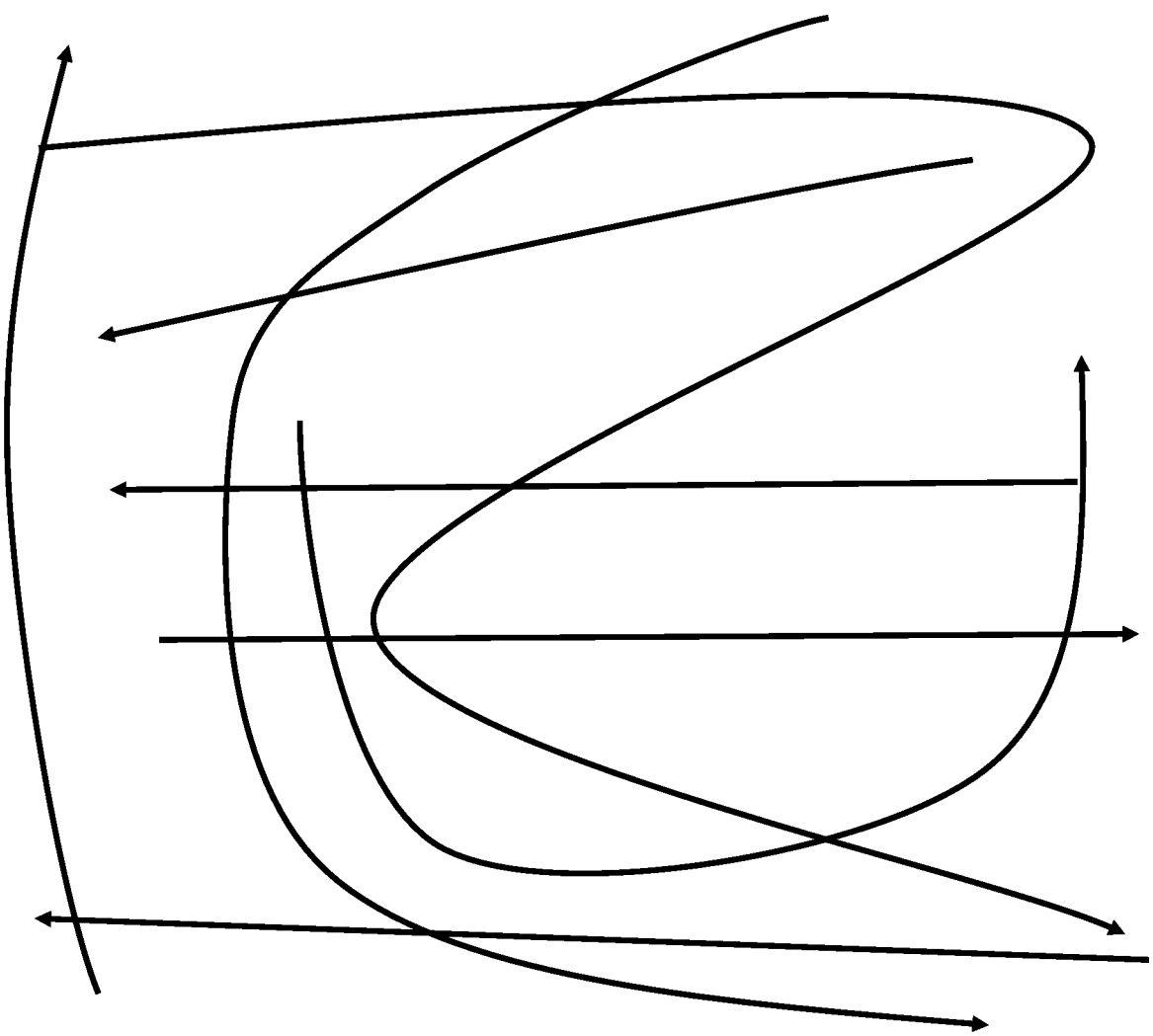
FIG. 4 illustrates an example of capture routes for capturing an environment.

In the example, the virtual environment is thus represented by a typically relative sparse set of spatial routes e.g. captured by moving a camera through a real world environment. Each route is linked to a video item as well as meta-data in the form of route data that provides positional information for the video item, and which specifically may provide a position indication for each frame of the video item. FIG. 4 illustrates an example of how a 2-dimensional environment may be covered by a number of (possibly fairly arbitrary) routes.

In the example, the client device 201 is arranged to request route data and video items from the server 203 and in response the server 203 will proceed to provide the requested data.

However, in the example, the client device 201 does not merely download all the data and process it locally but rather initially retrieves only the route data which is then used to dynamically determine which route(s) are close to the desired positions. The video items for the selected routes are then selectively retrieved from the server 203 and used to generate suitable views.

Thus, in the specific example, when the client device 201 initiates a virtual reality application, it requests route data from the server 203. In response, the server 203 extracts the route data from the route store 307 and transmits it to the client device 201. However, initially, no video data is provided and only the route data is transmitted over the network 205.

In more detail, when a new virtual reality application is initialized, the network interface 103 transmits a request to the server 203 to transmit the route data stored in the route store 307. In response, the server 203 transmits this route data. The route data is received by the network interface 103 and stored in the store 101. Thus, after the initial download, the store 101 stores a local replica of the route data for a set of routes in the N-dimensional space. Although each of the routes is associated with (/linked to) a corresponding video item representing the views of the route, these video items are not downloaded but remain at the server.

The client device 201 further comprises a position input 105 which is arranged to receive a viewer position indication. The viewer position indication is indicative of a position of a viewer in the N-dimensional space of the virtual environment, and thus is indicative of a desired view of the virtual environment. In some embodiments, the viewer position indication may be generated in response to a specific user input, such as e.g. by a user directly providing a position or e.g. controlling a joystick or a mouse. In other embodiments, the viewer position indication may be generated by an application e.g. also running on the client device 201. For example, the viewer position indication may be generated by a game application.

The viewer position indication may be a full six-dimensional pose indication providing a three-dimensional location and three-dimensional orientation for a viewer. In other embodiments, e.g. only a two-dimensional location together with a two-dimensional orientation may be provided (e.g. when the viewer is always considered to be at the same height and the routes essentially are two-dimensional routes).

The client device 201 further comprises a selector 107 which is coupled to the store 101 and the position input 105. The selector 107 is arranged to select routes from the stored set of routes based on the received viewer position indications. Specifically, for a given viewer position indication, the selector 107 is arranged to evaluate a selection criterion which is dependent on distance metric dependent on the viewer position indication and positions of the routes of the set of routes. Thus, based on the viewer position indication and the positional data for the stored routes, a distance metric is evaluated and one or more routes is selected as appropriate for generating view images for the current viewer position indication.

The client device 201 further comprises a retriever 109 which is coupled to the selector 107 and the network interface 103. The retriever 109 receives information of which video item(s) have been selected and in response it, via the network interface 103, communicates with the server 203 to retrieve the selective video item(s).

The client device 201 further comprises an image generator 111 for generating at least one view image for the viewer position indication from a first set of frames from the first video item. The retrieved video item is forwarded to the image generator 111 which proceeds to generate an image which corresponds to that which would be seen by a viewer at the position in the virtual environment indicated by the viewer position indication. The selection of the frames that are used for generating the view image may also be based on the viewer position indication and a spatial distance metric. Indeed, as the frames in the video item have positions along the routes, the frame(s) that correspond most closely to the position of the viewer position indication may be selected (e.g. subject to other parameters or considerations).

Thus, the for a given viewer position indication, the client device 201 may proceed to select an appropriate video item (or video items) and appropriate frame (or frames) of this video clip and use the selected frames to generate a view image. In some embodiments and scenarios, the selected frames may directly sufficiently closely correspond to the view image for the viewer position indication, and the generated view image may be generated directly as a copy of the selected frame.

However, in most embodiments and scenarios, differences between the position (including orientation) of the frame(s) and the viewer position indication can be compensated for by processing the frames. This processing may specifically be a view transformation based on depth information. It will be appreciated that many approaches for such view transformation will be known to the skilled person and can be used without subtracting from the invention.

The client device 201 is accordingly arranged to generate a view image based on a received viewer position indication. Indeed, the described process is iterated and the client device 201 accordingly can generate a sequence of view images in response to a sequence of viewer position indications. The client device 201 can specifically generate a sequence of views for a viewer moving along a route through the virtual environment.

The generated images can provide the views that a viewer would see when moving through the virtual environment following a trajectory indicated by a sequence of viewer position indications. However, in the example, this is achieved from a video item and route based approach rather than by relying on individual images. This provides for a much more efficient approach and allows efficient encoding, facilitated capture, reduced complexity, reduced storage requirements etc. Furthermore, the system may allow for substantially reduced communication requirements and storage requirements in the client device 201 as only the required video items need to be retrieved and downloaded. Thus, the approach may differentiate the treatment, and specifically the communication, of the route data and the video item data. Since route data will typically be at least an order of magnitude lower than the video data, this may provide a substantial reduction in the download communication requirements.

The selection of the appropriate route is based on a distance metric which reflects a distance between the (position of the) viewer position indication and the positions of the routes. Specifically, the distance metric may reflect the distance between the viewer position indication and a position of a current frame for the video item/route currently selected, and a minimum distance between the viewer position indication and the positions of routes for routes not currently selected. The distances may be determined in accordance with any suitable norm, or e.g. by a monotonically increasing function of a suitable norm.

Such a distance metric may provide a good indication of a suitable route by indicating which route has a position closest to the desired position. However, in the client device 201 of FIG. 1, the selection criterion is not merely based on the distance metric and does not merely select the route which is closest to the desired view point. Rather, the selector 107 is arranged to use a selection criterion which is biased towards a currently selected route relative to other routes. The selection criterion may accordingly be biased towards remaining on the current route, and thus generating view images based on the same video item rather than jumping to another video item.

In the client device 201 of FIG. 1, the selection criterion of the selector 107 is asymmetric with respect to the distance metric for the currently selected route (and thus video item) and for other routes (and thus video items) that are not currently selected. In particular, the selection criterion used will require the distance metric for another route to be smaller than the distance metric for the current route by a certain margin or threshold before the other route will be selected, i.e. before the client device 201 will switch to another route/video item.

Figure 5:
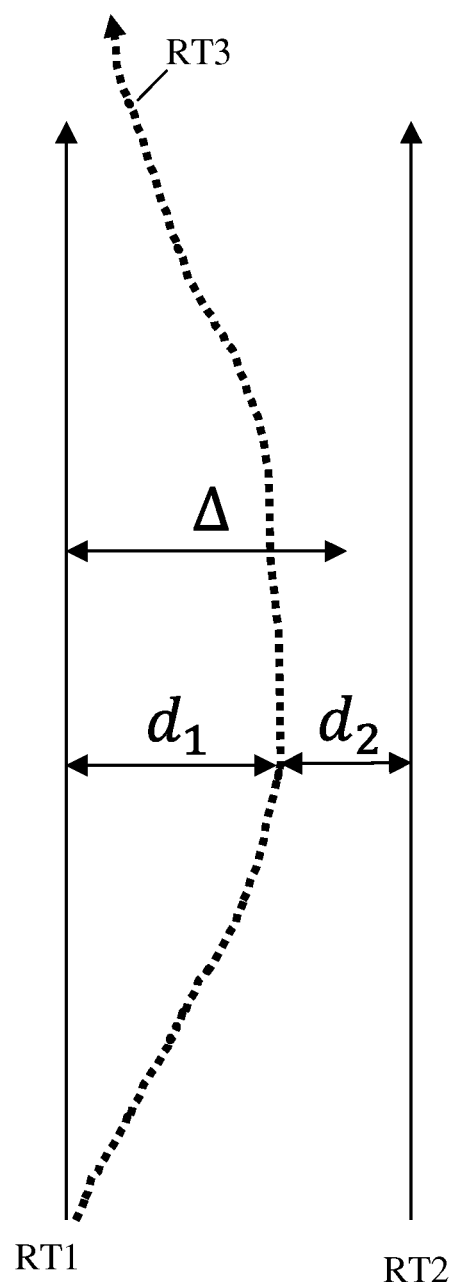
FIG. 5 illustrates an example of a viewer route relative to capture routes in a virtual environment.

A specific example may be provided with reference to FIG. 5 which illustrates two parallel routes RT1 and RT2 where RT1 is the currently selected route with the view images currently being generated based on the corresponding video item. A route RT3 of a viewer through the environment is situated between the two captured routes RT1, RT2 with varying distances to the two routes.

An example of a selection criterion for this example may be $$r_{selected} = \begin{cases} \text{argmin}_r(d_r) & \text{if } d_r > \Delta \\ r_{current} & \text{otherwise} \end{cases},$$

where $r_{current}$ is the currently selected route, $d_r$ is shortest distance to route $r$, and $r_{selected}$ is the selected route. This selection criterion has the result that switching to a different route and video only takes place when deviating further than a threshold distance $\Delta$ from the current route. Thus, the route is selected as the one having the lowest distance to the viewer position indication but only if the distance to the currently selected route exceeds a certain threshold $\Delta$. FIG. 5 illustrates this selection criterion being applied. In the example, the selected route is RT1 throughout despite RT2 being closer to the viewer position parameter vector at some positions.

The biasing of the selection criterion towards the currently selected route may provide substantial benefits in practice. Firstly, it tends to provide a more efficient approach with reduced communication requirements as the number of video items that need to be retrieved and downloaded typically can be reduced substantially.

Further, it may provide a substantially more consistent output with fewer perceptible artefacts. Indeed, a more stable and temporally and spatially consistent experience of the virtual environment is found to be provided.

In some embodiments, the route data is not limited to positional information for the routes but also includes data providing information of how the routes relate to each other.

In particular, the route data may further comprise information relating to the intersections between the routes. For example, as exemplified in FIG. 4, routes may in many embodiments be based on relatively random routes and this may result in many intersections and overlaps between routes. Indeed, intersections may also often occur when specific routes are generated intentionally to provide a good coverage of an environment. For example, a given space may be covered by intentionally walking a number of parallel and orthogonal routes in order to generate a grid system of routes. In such an example, there will be many intersections between the different orthogonal routes.

Different criteria for considering an intersection to exist between routes may be used in different embodiments. An intersection may be considered to occur between two routes when they have a common position. An intersection includes any junction between the two routes, such as a T-junction, or a junction between more than two routes. In some embodiments, an intersection/junction may be considered to exist when the distance between a position on one route and a position on another route is below a threshold value. The threshold value is typically very low and thus an intersection is typically considered to exist only when the two routes are substantially overlapping at least at one position.

In many embodiments, the selection criterion is further dependent on the stored intersection positions. Specifically, the selector 107 may be arranged to reduce the bias towards the currently selected route for viewer position indications corresponding to intersect positions. The viewer position indication may correspond to an intersect position when the position on the current route best matching the current viewer position indication (e.g. the shortest distance) is an intersection point where the current route intersects another route.

Thus, in some embodiments, the selection criterion will make it easier to select a new route when at an intersection (specifically when the mapping of the viewer position indication onto the current route is an intersection point) between the current route and the new route than when not at an intersection.

Indeed, in some embodiments, it may only be possible to select a new route when the viewer position indication corresponds to an intersection point/position. In such an embodiment, the viewer position indication may for example be changed according to a desired path or trajectory through the virtual environment. This viewer position indication will be projected on to the current route and the corresponding frames of the currently selected video may be extracted and used to generate the view images corresponding to the viewer position indication. However, for projected positions on the currently selected route which are not at an intersection point, the selector 107 may not select a new route, i.e. in this case the bias towards the currently selected route is extreme in that it does not allow selection of any new route. However, when the viewer position indication is changed to a value where the projected or corresponding position on the currently selected route matches an intersection point, the selection criterion may allow the selection of any other route at this intersection. Thus, the extreme bias towards the currently selected route is reduced and probably removed completely, e.g. in some embodiments the selector 107 may simply select the route as the route of the intersection which is closest to the viewer position indication.

Such an approach may thus allow the client device 201 to "snap" to the available routes and only "jump" to another route at intersection points. Although this may result in view images being generated based on frames that are spatially further from the viewer position indication than other available frames (from other video items), the approach may in many scenarios provide a preferred user experience. In particular, it allows improved consistency in the generated output view image sequence and may reduce the number and significance of errors or artefacts.

In many embodiments, the selection of other routes is not restricted to intersection points but a more gradual variation in the bias is performed. In many embodiments, the bias towards the currently selected route may be dependent on a distance metric indicative of a distance between the viewer position indication and intersect positions. The distance metric may in many embodiments be a suitable norm or in some embodiments, the distance may be measured along the route, and specifically along the currently selected route. Thus, the viewer position indication may be projected on to the currently selected route (e.g. the position on the route with the shortest distance to the viewer position indication) and the distance along the route from this projected position to the intersection point may be determined.

In most embodiments, the bias towards the currently selected route will be reduced for reducing distance to the intersection point. In such an example, the client device 201 will still seek to "snap" to the current route but it may allow a "jump" between different routes even if this is not at an intersection point. This approach may allow a more flexible approach which e.g. may allow some "cutting of corners" between routes when appropriate.

The selection of the frame or frames that are used to generate a view image for a given viewer position indication may be selected from the selected video item (corresponding to the selected route) based on different considerations. However, the frames are typically selected by the image generator 111 in response to route position data for frames of the first video item relative to the viewer position indication. Specifically, the positions of the frames in the selected video item are compared to the viewer position indication and a distance metric may be determined. In some embodiments, the frame or frames may simply be selected as the frames that are spatially closest to the viewer position indication.

In some embodiments, the selection of the frame(s) may further consider a temporal aspect. Specifically, when the frames to be used for generating the view image are frames from the currently selected route/video, i.e. when the system remains on the same route and has not jumped to a new route, the selection may bias the frame selection towards frames that are temporally close (in the video item) to the currently selected frames. Thus, when new frames are selected without a change of the video item being used, the new frames are selected such that there is a bias towards a smaller temporal distance in the video item. For example, if two sets of frames are spatially equally distant to the viewer position indication, the image generator 111 will proceed to select the frames that are closest to the previously selected frames.

Specifically, a frame selection metric may be used which increases for a decreasing temporal distance to a currently selected frame of the video item. Specifically, the frame selection metric may increase the lower the difference between the frame numbers in the video item.

Figure 6:
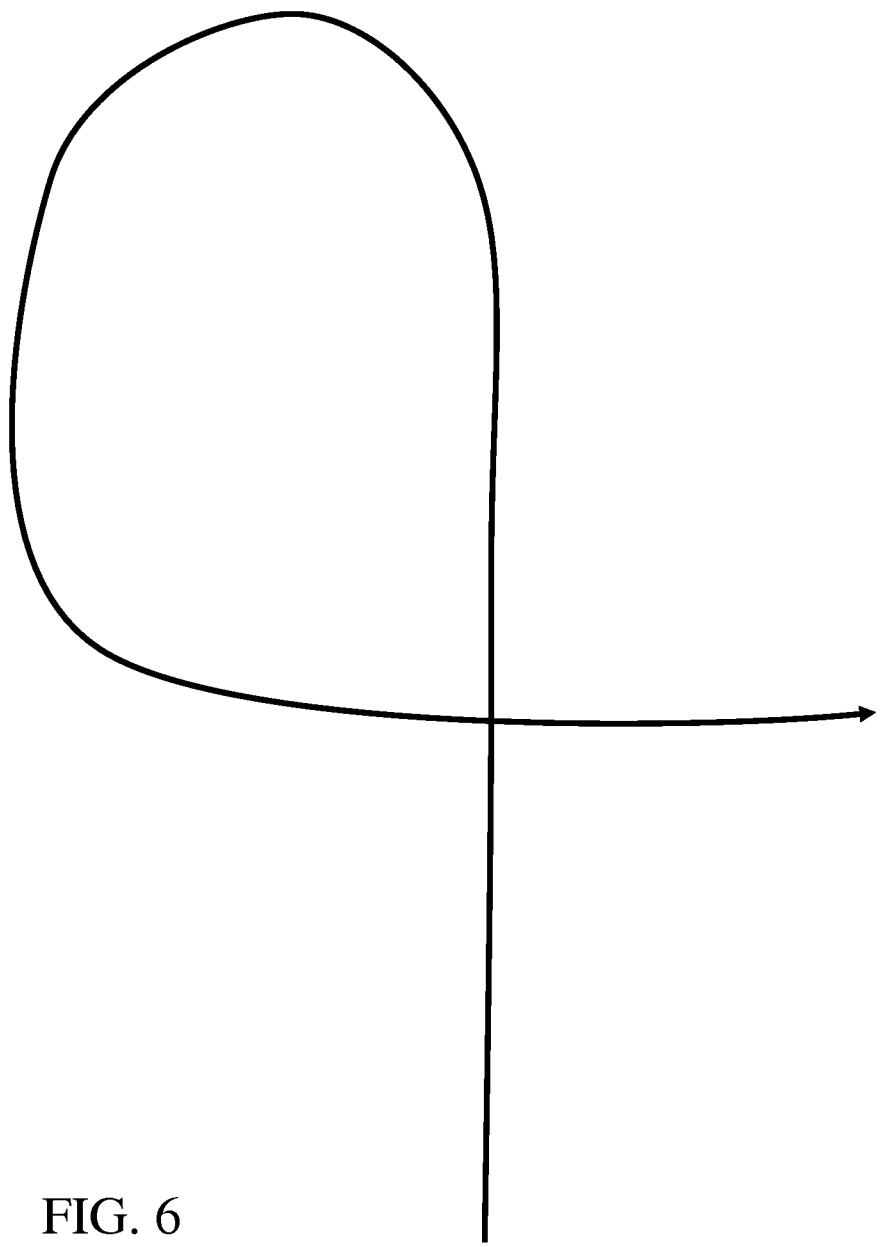
FIG. 6 illustrates an example of capture routes for a virtual environment.

The approach may provide improved performance in many embodiments. In particular, it may provide improved operation in many scenarios wherein the current route actually intersects itself. An example of such a route is provided in FIG. 6. In the example, the route overlaps itself thereby creating an intersection point. If the selection of the frames is merely based on the spatial distance, a viewer position indication remaining around the intersection point and possibly moving slightly (e.g. randomly) could result in a frequent shift in the set of frames being used for generating the view image, namely it could switch between the frames from the first time the intersection point is reached to the frames from the second time it is reached. Accordingly, the selected frames would randomly and possibly frequently switch between frames at very different times in the video item. This will result in the image generation being based on different frames and this is likely to result in substantial temporal noise.

However, by suitably biasing against temporally jumping to different parts of the same video item, this can be avoided and a much more consistent and stable output can be generated. E.g. for the example of FIG. 6, if the user moves towards an area corresponding to the intersection point from the bottom of the picture, the view images when the user is in the area will be based on the frames from the first time the intersection point was reached, and will continue to be so. However, if the user approaches the area corresponding to the intersection point from the left of the picture, the view images when the user is in the area will be based on the frames from the second time the intersection point was reached, and will continue to be so.

The described system is based on using one (or more) video items corresponding to routes (/paths/trajectories) through the virtual space to generate suitable view images. A key consideration in such a system is how to select which video item to use, and specifically when to switch routes/ video items.

In the client device 201, the approach seeks to render view images from the same video and to bias against switching to new video items. In a similar vein, when selecting which frames to use within a video item, the client device 201 biases against temporal jumps.

This provides a number of advantages and is based on various considerations. For example:

1. Typically, the disparity/depth used for view synthesis is estimated using a stereo camera and temporal stability is enforced using temporal depth filtering. While the depth values may be incorrect, they are typically consistent from one frame to the next which means that temporal artefacts are often avoided.

2. Virtual camera positions that correspond to adjacent frames in a single video are typically close together. For instance, at 30 frames per second, virtual cameras may be 3 mm to 1 cm separated. Virtual camera positions from different videos may be as far as 20 cm or more apart which means that suddenly shifting the reference view-point over such a large distance is likely to result in artefacts.

3. Frequently switching will increase coding overhead since each large jump within a single video stream or each jump between videos will require download and decoding of an intra coded frame.

The approach thus relates to representing an environment such that images can be generated for different view poses for user that is not restricted to a specific pose in the environment.

One of the main challenges in the field, and for such applications, is how to effectively represent and capture environments in a way that allows high quality images to be generated for different poses yet can be stored without requiring excessive memory, is in a format that allows for suitable processing and image generation without excessive complexity and without requiring excessive computational resource, can reduce communication requirements in client/ server applications etc. Another very substantial challenge is to enable a practical capture operation which preferably does not require too expensive or specialized circuitry, and which is not to onerous or demanding.

The conventional approach is simply to take individual pictures (images and depth) of the scene from typically predetermined view poses and then store these images and depth pictures. Typically, the capture poses are pre-determined and the user must manually move a camera to a new pose, take the picture, move it to the next pose, take another picture, etc. This is a very time consuming and burdensome process. Alternatively, a large number of cameras can be used but this is not only expensive but also very cumbersome as all the cameras need to be carefully positioned with the correct pose. Further, a large number of pictures are required for an accurate operation and thus a large number of individual pictures need to be stored in an accessible way.

In conventional approaches, the view image for a given view pose is then generated by view point switching from the available and stored pictures using one of the well-know view point shift algorithms.

In the described approach, the scene is not represented by individual pictures but are represented by a plurality of routes and linked video items. For example, the approach allows a capture process wherein one or more people can simply move around in a given environment capturing a video with associated position. For example, a group of people may simply walk around a scene capturing videos as they walk along e.g. random routes. The video items with associated route data can then be compiled to provide a set of a plurality of routes with associated video items, thereby providing a representation of the scene. The approach may thus allow a much simplified capture operation, and may for example allow capture simply to be performed by capturing a large number of random routes with video. Thus, rather than requiring a meticulous and planned capture using individual images in order to generate a sufficiently accurate representation of the scene, the use of routes and video streams allows for a much larger amount of information to be captured thereby often obviating the need for the strict controlled image capture at advantageous positions.

Specifically, by basing the scene representation on video items (and associated route information) rather than merely on individual images, the memory/storage requirements can be reduced substantially and/or the amount of information that can be stored may be much higher. The encoding of video is much more efficient than encoding of individual images. Video encoding not only exploits redundancy within an image to reduce the required amount of data but also (and often much more effectively) exploits redundancy between different frames to substantially reduce the data amount for each frame (e.g. using motion estimation). For many typical scenes for e.g. virtual reality applications (e.g. static scenes), the correlation between different frames is so high that an enormous reduction in data can be achieved.

Thus, one effect of the use of video items with associated routes in comparison to using discrete images is that it allows much more efficient compression which in practice allows a completely different capture operation to be performed where the representation is not based on images from carefully selected positions but rather on a plurality (and typically relatively large number) of routes that may typically be substantially random. The approach typically reduces storage requirements, and very substantially reduces the complexity and effort of the capture representation.

The described approach is however not merely concerned with the representation of the environment by a plurality of linked routes and video items. Rather, it also is concerned with how images are generated from such a representation.

In the described approach, the determination of a suitable base from which to generate the view image relies on a route based selection process. A selection criterion is used to select a route, and the image is generated from at least one frame of the linked video. The selection is based on a distance from the viewer position but the selection criterion further comprises a biasing towards the currently selected route.

Thus, rather than just selecting the closest route, the selection criterion further comprises a bias towards the currently selected route relative to the other routes. Thus, the system does not merely select the closest frames but may be biased to continue to create images based on a temporally consistent selection of frames belonging to the same route. The system may effectively "snap" onto a route and stay on this route (as the basis for generating images) until the bias is no longer sufficient to keep the user snapped to this route. For example, the selection criterion may bias towards the current route by requiring that switching to a different route requires the distance to this other route to be, say, less than half the distance to the current route.

The approach is heavily dependent on the specific approach of representing the scene by a plurality of routes and linked video items. The images (frames) and capture positions of the described approach are not independent and isolated from other images and capture positions but rather the video items comprise closely interrelated frames and these are closely interrelated with the routes. Indeed, the frames of the video items have a spatial relationship and are closely correlated with each other, i.e. consecutive frames of video items typically have a high degree of correlation. Similarly, the routes define a number of positions that are directly related to the video items, and thus the routes do not merely provide information on positions in space, but provide temporal information, such as information of how the positions change for the frames in the video link (which is inherently a temporal representation).

The inventors have realized these differences and realized that an approach of just selecting the closest image information to the current view is less suitable for representations and capture data that is not merely for isolated captures defined only by positions, but instead provides a sequence of closely correlated captures that have closely related properties (specifically having a temporal relationship in a video item).

In particular, the Inventors have realized that whereas it may indeed be possible to simply select the nearest picture (and thus frame in the video item based capture), this will be computationally very complex and will tend to result in errors due to the correlation between frames and capture positions being ignored.

Specifically, the inventors have realized that frames of video items are not encoded as individual frames but are encoded with reference to other frames in the video item. Typically, a video item includes some intra-coded frames with typically a substantially much larger number of inter-coded frames that are encoded with reference to other frames and with a much higher efficiency than the intra-coded frames.

This in particular makes it difficult to extract individual images as these will require extraction of both the relevant intra-coded frames, decoding of these, extraction of any predicted frames from which the desired frame is predicted, decoding of these using intra-coded frames, extraction of the desired frame, decoding of this, and finally the combination of all of these. This has a very high computational burden. Furthermore, coding errors, noise, and artefacts are unavoidable, and these may reduce the resulting image quality.

The inventors have further realized that by considering not only the position but also the history of the viewer position, it is possible to adapt to and exploit the temporal and interframe correlation present in video items. This is done by making the selection based on routes rather than just considering individual positions, and by further biasing this selection towards "sticking" on the same route.

This results in an approach that, in particular, is much more efficient for the properties of video encoding, and it specifically addresses the problems of generating images from video items. Specifically, it has in practice been found to reduce the computational burden very substantially. The route based selection and the increased consistency of selecting (often consecutive) frames from the same video item/route results in substantial reuse of intra-coded frames that need only be decoded once for all the inter-coded frames that are encoded based on these. Similarly, the need for generating intermediate predicted frames for another frame will not introduce an overhead if these intermediate frames have already been used to generate previous images.

In addition, the unavoidable encoding/decoding errors and artefacts will in the approach tend to be much more consistent for consecutive images. For example, an encoding/decoding artefact that occurs for an intra-coded frame will be equally represented in all images that are generated based on frames from the same video item/route that are encoded using that intra-coded frame. This may often be preferable to potentially less visible errors or artefacts that however are less consistent between consecutive generated images.

Thus, the approach for a biased route-based selection of routes/video items provides a substantially improved performance, and in particular allows for lower computational complexity and resource usage, reduced storage requirements, facilitated generation of view images, improved image quality. It may also reduce communication requirements e.g. for client server based applications.

Figure 7:
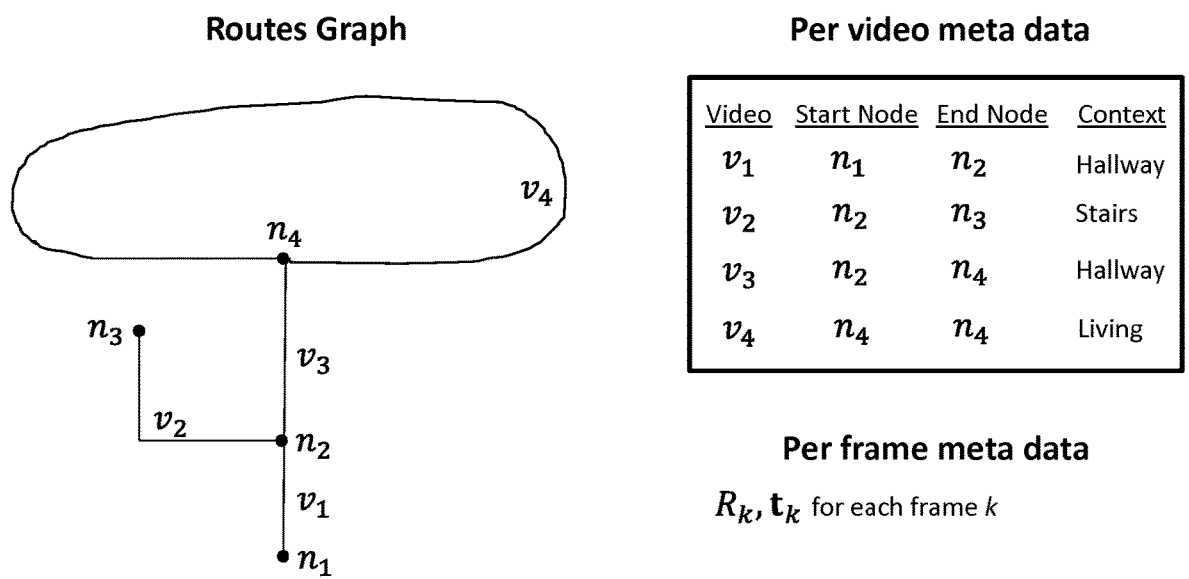
FIG. 7 illustrates an example of a graph of capture routes/video items representing a virtual environment.

In some embodiments, the route data may include a graph represented by having intersections as nodes and routes as edges. An example for a virtual environment corresponding to a house is provided in FIG. 7.

In the example, each node thus represents an intersection between routes, including t junctions (n2). In such a graph, an intersection may further reflect a position where one route ends and another begins. In the example, each route is thus bounded by two nodes with the nodes typically being common for a plurality of routes. The approach is particularly suitable for a scenario wherein the routes and video items are generated by dedicated and planned capture or where captured routes and video items have been divided into smaller routes and video items. The graph may e.g. be encoded as a binary section or a text (e.g. xml) and may (at least partially) be transmitted from the server 203 to the client device 201 when the application is initialized.

The use of a graph may be efficient in many embodiments and may provide an efficient operation. For example, the graph structure, allows for it to be determined that at the end of a given route, a number (0, 1, . . . ) of defined other routes may begin and thus retrieval and decoding of the corresponding videos may be initiated in advance thereby reducing potential lag and interruptions.

In some embodiments, the route data may further include relationship data indicative of a spatial relationship between routes of the set of routes. The relationship data may then be used in the selection of the route for the current viewer position indication.

As a specific example, the relationship data may for each route provide an indication of which other routes it crosses. The selector 107 may in some embodiments then for the currently selected route check the relationship data to see which other routes that it crosses and has intersections with. The selector 107 may then proceed to consider e.g. only these specific routes when determining whether to select a different route.

In some embodiments, the relationship data may provide an indication of which routes form junctions with each other. Such data may be used by the selector 107 to select the appropriate video and frames for view synthesis. For instance, when approaching a T-junction we can anticipate early on, based on position data, whether the user in inclined to take a right or a left turn at this junction.

In some embodiments, the relationship data may provide an indication that some routes correspond to opposite directions of movement for the same path. Such data may be used by the selector 107 to switch direction when the viewer is turning e.g. 180 degree on its path.

In some embodiments, the relationship data may provide an indication of routes that are substantially parallel to each other. Such data may be used by the selector 107 to decide to switch to another path that better represents the direction that a user is heading in.

Figure 8:
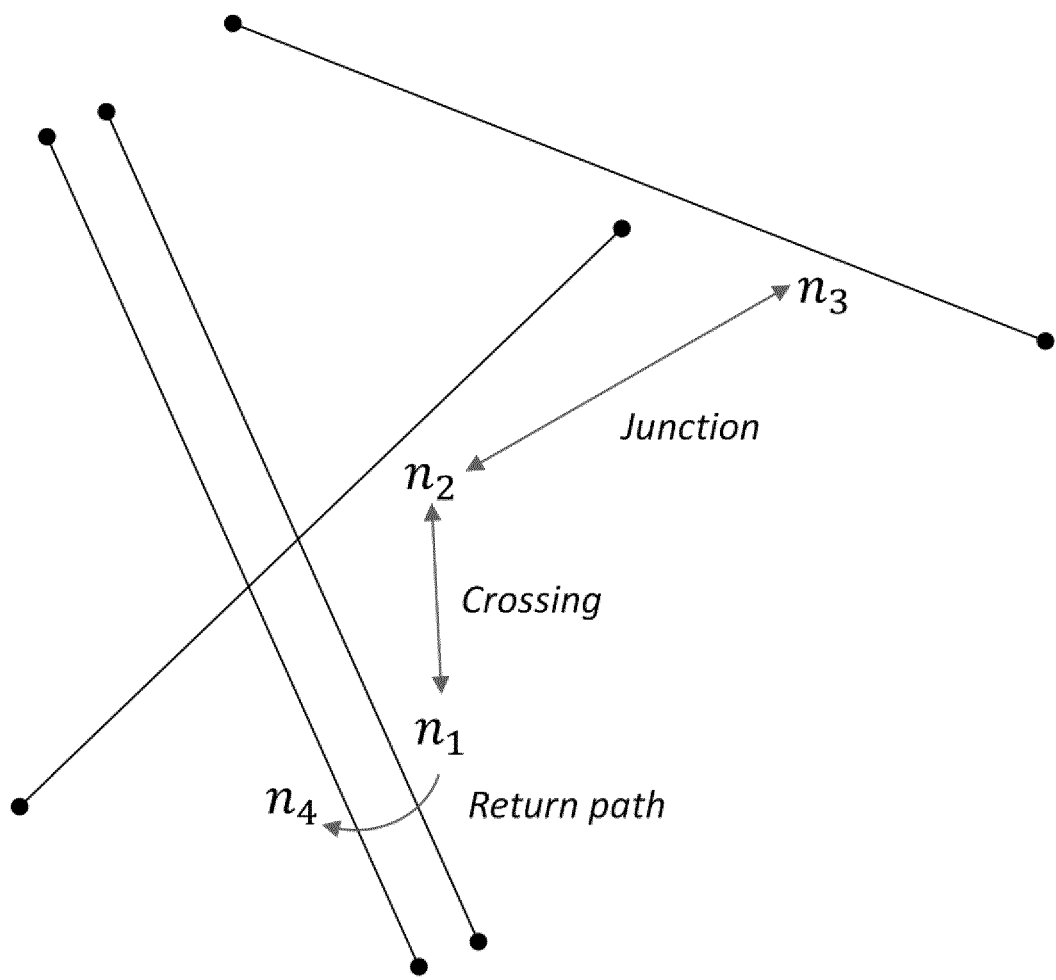
FIG. 8 illustrates an example of a graph of relationships between capture routes/video items representing a virtual environment.

The relationships may for example be provided in the form of a graph which has the routes as nodes and the edges indicating the relationship between the corresponding two nodes. An example of such a graph is illustrated in FIG. 8.

As mentioned previously, any suitable video encoding of the video items may be used without detracting from the invention. In many embodiments, the video items may be encoded using both intra-coded frames that are encoded without consideration of any other frames and predicted frames that are encoded relative to at least one other frame. The predicted frames may be encoded relative to one or more intra-coded frames and/or or more predicted frames. The predicted frames may be frames that are only encoded relative to one or more earlier frames (i.e. temporally earlier in the video item) or may e.g. be bi-predicted frames that are encoded relative to one or more earlier frames and relative to one or more later frames (i.e. relative to frames both before and after the current frame). The video encoding may be a H.264 or H.265 video encoding.

In many embodiments, it may be particularly advantageous for the encoding process to use only I-frames (intra coded frames pictures) in connection with B-frames (bi-predicted frames). This may result in low-latency generation of the view images in many embodiments.

Thus, the video items may be encoded video items comprising intra-coded frames and predicted/inter-coded frames. The predicted frames may in some embodiments only be bidirectionally predicted/encoded frames. The generation of the view image may accordingly include the image generator 111 decoding the frame(s) that are used for generating the view image.

The described approach in particular seeks to provide efficient capture, storage and playback of views of a virtual environment based on a set of a plurality of routes. The use of video items rather than individual images reduces storage requirements, communication bandwidth requirements, etc. This is achieved as video encoding tends to be much more efficient than encoding of separate images. Especially the use of predicted frames may very significantly reduce the amount of data required to represent a frame. However, the use of video captures and coding is counterintuitive for representing a virtual environment in which the user may move freely. For example, in such situations, the user may move in the opposite direction of the direction in which the video was captured thereby not only not following, but even being directly opposite to, the spatial and temporal relationships of the video content. However, the Inventors have realized that the approach may provide a very efficient operation.

The described approach of route based selection with a bias towards staying on the same route provides improved operation. In particular, the Inventors have realized that such a bias (besides resulting in more temporally stable view synthesis quality) results in a much reduced bandwidth requirement (reduced data rate for retrieving/communicating the frame) due to the frames corresponding to the user view points being inter-coded (predicted) when the user continues to be linked to the same route rather than switch to another route (i.e. when the selection of the route changes from one to another).

In many embodiments, the selection may take the video encoding into consideration when selecting the route. Specifically, in many embodiments the selector 107 may be arranged to reduce the bias towards the currently selected route for viewer position indications corresponding to intra-coded frames. The selector 107 may be arranged to reduce the bias towards the currently selected route for viewer position indications corresponding to intra-coded frames relative to viewer position indications corresponding to inter-coded (predicted) frames. Thus, the selector may be more likely to select a new route rather than to continue on the same route when the viewer position corresponds to an inter-coded/predicted frame.

The considered frame (affecting the bias) may in some embodiments be a frame of the currently/previously selected route or may be a frame of the new candidate route. Thus, the frame may be the frame that will be used to generate the view image for the currently/previously selected route (if this is selected) or may be the frame that will be used to generate the view image for the candidate route if this is selected. Thus, the frame may be the frame of the currently selected route or of the first route (the route that is selected). In many embodiments, the bias may be reduced both for the target/candidate frame being an intra-coded frame and for the currently/previously selected route frame being an intra-coded frame.

The corresponding frame(s) for a viewer position indication may be the frame(s) of a given route that will be used to generate a view image for the viewer position indication if the given route is selected. A corresponding frame may typically be the frame in the given route closest to the pose/position indicated by the viewer position indication (typically using the distance metric also used to select the route).

In many embodiments, the first frame may be selected as an intra-coded frame following a switch from one route to another route. When switching to a new route, the image generator 111 may accordingly proceed to first select an intra-frame and use this to generate the view image.

In many embodiments, these approaches may be used to establish links between different routes. For example, FIG. 9 illustrates two routes 901, 903 with a plurality of positions associated with intra-coded frames (indicated by small circles). In such an embodiment, the bias to stay on the same route may be reduced for the intra-coded frames and the frame selected for the new route may correspond to another intra-coded frame. In particular, the bias towards the current route may be reduced (typically very substantially) for route switches that occur between two intra-coded frames. Thus, "jumps" will tend to occur between intra coded frames as indicated by arrows in FIG. 9.

In practice, this may be achieved by including such considerations in the graph representing the routes as previously described. Indeed, nodes may be created in such a graph near crossings/intersections. Furthermore, the nodes may be selected to correspond to intra-coded frames with the segments inbetween corresponding to inter-coded frames. Further data may then be provided which links such nodes, e.g. indicating the relationship between them (such as e.g. "crossing" or "return path").

As described later, the system may specifically generate intra-coded frames at intersections between routes (e.g. by transcoding a video item).

In many embodiments, it may furthermore be preferred to use a relatively large number of B-frames between the I-frames of a given route. This approach results in a high efficiency since B-frames (which are residual frames after compensating for the prediction) are often more compressed than I-frames. The use of a high number of B-frames is typically acceptable due to the high coherence between adjacent camera positions in a static scene. Having a large number of B-frames between I-frames is also attractive for video playback since less I-frames need to be decoded for a given movement of the user.

However, in order to mitigate potential downsides to using a large number of B-frames when changing video items due to selection of a new route, the approach may use a selective allocation of I-frames.

In many embodiments, I-frames may be generated and included in the video items for intersections. Thus, frames associated with intersections may be encoded as I-frames. This may provide particularly attractive performance in many embodiments as it may facilitate the switching of routes. Indeed, having intersection frames encoded as I-frames will tend to result in switching being performed at the intersections providing associated video items that start and/or stop with an I-frame, and thus avoiding that in order to encode a B-frames, additional I-frames must be encoded.

Indeed, if an intersection frame is encoded as an I-frame, the same I-frame may potentially be used both for the previously selected route and for the newly selected route. Thus, an I-frame from the previously selected route may be used together with an I-frame for the newly selected route in order to decode a B-frame of the newly selected route. In some embodiments, this may be achieved using an I-frame of the previous route which is not exactly at an intersection point but is potentially close to this and accordingly provides a reasonable estimate. However, in a preferred approach the I-frame of the previously selected route may be a frame at an intersection, and indeed the I-frame could even be a common frame for the video item associated with the previously selected route and for the video item associated with newly selected route.

In many embodiments, advantageous organization and structure of the B-frames and I-frames may be implemented. For example, the server 203 may first provide suitable I-frames. These may be decoded by the client device 201 even if not directly associated with the current viewer position indication. However, the decoded I-frames may then provide reference frames that allow quick decoding of appropriate B-frames when these are selected by the image generator 111 to be used for generation of the view image. Indeed, in many embodiments, a hierarchical video encoding approach may be used where B-frames are arranged in a hierarchical structure such that some B-frames may further be used as reference frames for other B-frames. In such cases, appropriate B-frames may further be decoded in readiness to be used as reference frames for other B-frames.

Thus, in some embodiments, the retriever 109 may thus comprise a decoder which decodes a number of I frames and potentially B-frames in readiness for these to be used for decoding of other B-frames which have been encoded relative to these frames.

Accordingly, in some embodiments a hierarchical ordering of B-frames may be employed allowing random access and bidirectional playback from the video while maintaining high coding efficiency by avoiding a large fraction of I-frames. For example, at all times, the decoder may have at least two I-frames and a number (0 or more) of B-frames ready (decrypted and decoded) to be used as reference for decoding B-frames.

Such approaches may be supported by newer video encoding schemes such asH.264/MPEG-4 AVC and HEVC.

It will be appreciated that whereas the above description has focused on a client server approach as exemplified by FIG. 2, the concepts are not limited thereto but are equally suitable for many other arrangements and distributions of functionality. For example, in some embodiments, the video store storing the video items may be a local store and the retriever 109 may retrieve the video from the local store. In some embodiments, the approach may be used in a single stand-alone device storing both the video items and the route data and generating the view images in response to a received viewer position indication.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus comprising:
   a memory circuit,
      wherein the memory is arranged to store a set of routes,
      wherein the set of routes are in an N-dimensional space,
      wherein the set of routes in an N-dimensional space represents spatial poses,
      wherein the set of routes comprises a plurality of routes,
      wherein each route of the set of routes describes a camera trajectory of poses through the N-dimensional space,
      wherein each route of the set of routes is linked to a video item,
      wherein the video items comprise frames,
      wherein the frames comprise both image and depth information for camera poses of the route;
   an input circuit, wherein the input circuit is arranged to receive a viewer position indication;
   a selector circuit,
      wherein the selector circuit is arranged to select a first route of the set of routes in response to a selection criterion,
      wherein the selection criterion is dependent on a distance metric,
      wherein the distance metric is dependent on the viewer position indication and positions of the routes of the set of routes;
   a retriever circuit, wherein the retriever circuit is arranged to retrieve a first video item associated with the first route from a video source; and
   an image generator circuit, wherein the image generator circuit is arranged to generate at least one view image for the viewer position indication from a first set of frames from the first video item,
      wherein the selection criterion is biased towards a currently selected route relative to other routes of the set of routes.

2. The apparatus of claim 1, wherein the image generator circuit is arranged to select the first frames in response to route position data for frames of the first video item relative to the viewer position indication.

3. The apparatus of claim 1, wherein the image generator circuit is arranged to, if the first route is selected as the currently selected route, bias selection of the first set of frames towards frames having a smaller temporal distance to a currently selected first set of frames of the first video item.

4. The apparatus of claim 1, wherein the image generator circuit is arranged to, if the first route is selected as the currently selected route, perform the selection of the first set of frames based on a frame selection metric which increases with a decreasing temporal distance to a currently selected frame of the first video item.

5. The apparatus of claim 1,
   wherein the memory circuit is arranged to store intersect positions for routes of the video sequences,
   wherein the selection criterion is dependent on the intersect positions.

6. The apparatus of claim 5, wherein the selector circuit is arranged to reduce the bias towards the currently selected route for viewer position indications corresponding to intersect positions.

7. The apparatus of claim 5, wherein the bias towards the currently selected route is dependent on a distance between the viewer position indication and intersect positions.

8. The apparatus of claim 5, wherein the memory circuit is arranged to store a graph having intersections as nodes and routes reflected by edges.

9. The apparatus of claim 5, wherein frames associated with intersection positions for at least some video sequences are intra coded frames.

10. The apparatus of claim 1, wherein the image generator circuit is arranged to generate the view image from at least a first frame of the first set of frames and a second frame from a video item linked to a previously selected second route.

11. The apparatus of claim 10,
wherein the memory circuit is arranged to store intersect positions for routes of the video sequences,
wherein the selection criterion is dependent on the intersect positions,
wherein the second frame is a frame associated with an intersection between the first route and the previously selected second route.

12. The apparatus of claim 1,
wherein the memory circuit is arranged to store relationship data,
wherein the relationship data is indicative of a spatial relationship between routes of the set of routes,
wherein the selection of the first route is in response to the relationship data.

13. The apparatus of claim 12 wherein the relationship data is indicative of at least one spatial relationship between two routes from the group consisting of a crossing of the two routes, a junction of the two routes, a first route of the two routes corresponding to an opposite direction of movement to a second route of the two routes or, the two routes being parallel.

14. The apparatus of claim 1,
wherein the video items are encoded video items,
wherein the video items comprise both intra-coded frames and inter-coded frames,
wherein the selector circuit is arranged to reduce the bias towards the currently selected route for viewer position indications corresponding to intra-coded frames relative to viewer position indications corresponding to inter-coded frames.

15. A method comprising:
storing a set of routes,
wherein the set of routes are in an N-dimensional space,
wherein the set of routes in an N-dimensional space represents spatial poses,
wherein the set of routes comprises a plurality of routes,
wherein each route of the set of routes describes a camera trajectory of poses through the N-dimensional space,
wherein each route of the set of routes is linked to a video item,
wherein the video items comprise including frames,
wherein the frames comprise both image and depth information for camera poses of the route;
receiving a viewer position indication;
selecting a first route of the set of routes in response to a selection criterion,
wherein the selection criterion is dependent on a distance metric,
wherein the distance metric is dependent on the viewer position indication and positions of the routes of the set of routes;
retrieving a first video item associated with the first route from a video source;
generating at least one view image for the viewer position indication from a first set of frames from the first video item,
wherein the selection criterion is biased towards a currently selected route relative to other routes of the set of routes.

16. The method of claim 15, wherein the generating is arranged to select the first frames in response to route position data for frames of the first video item relative to the viewer position indication.

17. The method of claim 15, wherein the generating is arranged to, if the first route is selected as the currently selected route, bias selection of the first set of frames towards frames having a smaller temporal distance to a currently selected first set of frames of the first video item.

18. The method of claim 15, wherein the generating is arranged to, if the first route is selected as the currently selected route, perform the selection of the first set of frames based on a frame selection metric which increases with a decreasing temporal distance to a currently selected frame of the first video item.

19. The method of claim 15,
wherein the storing is arranged to store intersect positions for routes of the video sequences,
wherein the selection criterion is dependent on the intersect positions.

20. The method of claim 15, wherein the selecting is arranged to reduce the bias towards the currently selected route for viewer position indications corresponding to intersect positions.

* * * * *